Feb. 13, 1934. J. E. SMITH 1,947,426
ELECTRICAL COOKING APPARATUS
Filed Dec. 12, 1931 2 Sheets-Sheet 1

INVENTOR
John E. Smith
BY HIS ATTORNEY

Feb. 13, 1934.   J. E. SMITH   1,947,426
ELECTRICAL COOKING APPARATUS
Filed Dec. 12, 1931   2 Sheets-Sheet 2

Inventor
John E. Smith
By his Attorney

Patented Feb. 13, 1934

1,947,426

UNITED STATES PATENT OFFICE 1,947,426

ELECTRICAL COOKING APPARATUS

John E. Smith, Belleville, Ill.

Application December 12, 1931
Serial No. 580,589

7 Claims. (Cl. 219—44)

My invention relates to electrical cooking apparatus wherein it is desired to maintain the contents within a predetermined temperature range after the completion of the cooking.

Heretofore, cooking apparatus that has sought to maintain the contents thereof heated after completion of the cooking has always required a long re-operation of the heating element used for the cooking with the result that the contents which have already been cooked are again subjected to the now undesired high temperatures that were used during the original cooking. This is undesirable because such temperature is much higher than is usually desired at the time of actual use or consumption of the cooked substances, and because it is very often harmful to recook the substance. Furthermore, such long operation involves unnecessary waste of electrical energy.

Some attempt has been made to overcome these faults by the use of additional or auxiliary heating elements of low capacity, and the like, but such means involves additional cost in the manufacture of the appliance as well as other disadvantages from the standpoint of the user of the appliance.

It is one object of my invention to provide a simple arrangement whereby the contents of a cooking appliance may be kept heated without re-heating the contents to the former cooking temperatures. This is accomplished without the use of extraneous heating elements, etc.

It is another object of my invention to provide in appliances of the above indicated character a heating element having a definite thermal-lag factor.

It is a further object of my invention to provide in appliances of the above indicated character a heating element in which provision is specifically made for a residual-heat factor and with which cooperates a thermostat that is designed to have an operating range, the upper limit of which is below the intended cooking temperature of the appliance.

A still further object of my invention is to shield the thermostatic control for the heating appliance from the direct heat of the heating element.

A still further object of my invention is to provide an arrangement for adjusting the thermostatic control to various temperatures both for cooking and for the subsequent use.

It is a still further object of my invention to provide in combination with the foregoing an arrangement to suppress the arcing at the contacts of the thermostat.

It is an even further object of my invention to provide novel construction and arrangement of the apparatus shown herein which novel features, however, may be claimed in others of my applications for patent on the specific apparatus.

Other and further objects of my invention will be apparent from the following specification taken in conjunction with the accompanying drawings wherein—

My invention is shown and described as applied to coffee brewing apparatus for convenience of illustration and description only. The invention is readily applicable to other apparatus.

In practicing my invention in this class of coffee brewing apparatus I use a heating element which is imbedded in a material having a substantial residual heat factor. The heating element is isolated or insulated thermally from the material of the vessel. The thermostat is located outside of the vessel, but has direct physical connection with the vessel. Accordingly, as the heating element is energized the temperature of the heating element builds up and the water is heated to the boiling point or to whatever temperature the particular apparatus requires for the brewing of the coffee, but it is the temperature of the water that affects the thermostat, and it is not acted upon directly by said heating element.

At the time the brewing of the coffee is completed, or nearly so, the high temperature of the liquid, communicated to the body of the vessel and through the body of the vessel to the thermostat, causes the thermostat to operate to cut off the supply of current to the heating element. Because of its residual heat factor, the heating element remains at a high enough temperature to maintain the body of coffee hot for a very considerable period of time.

However, if the vessel is allowed to stand for too long a period whereby the body of liquid cools down below a desired temperature, then the thermostat closes and again energizes the heating element. Since the heating element is already heated to a considerable degree, it does not require nearly so long a period of operation as for the original cooking operation to raise its temperature and that of the liquid coffee to the temperature desired. This second period of operation is not long enough to heat the liquid coffee up to or beyond the temperature at which the brewing process would be repeated before the thermostat again cuts off the supply of current to the heating element. This latter period of operation being short, there is no waste of electric energy while yet gaining the object of maintaining the coffee at a temperature that is considered hot for ordinary consumption. The now reheated heating element again serves to maintain the liquid coffee above the selected minimum temperature for a considerable period of time, but the above cycle of operations may be repeated indefinitely until it is desired to consume the coffee.

Figure 1:
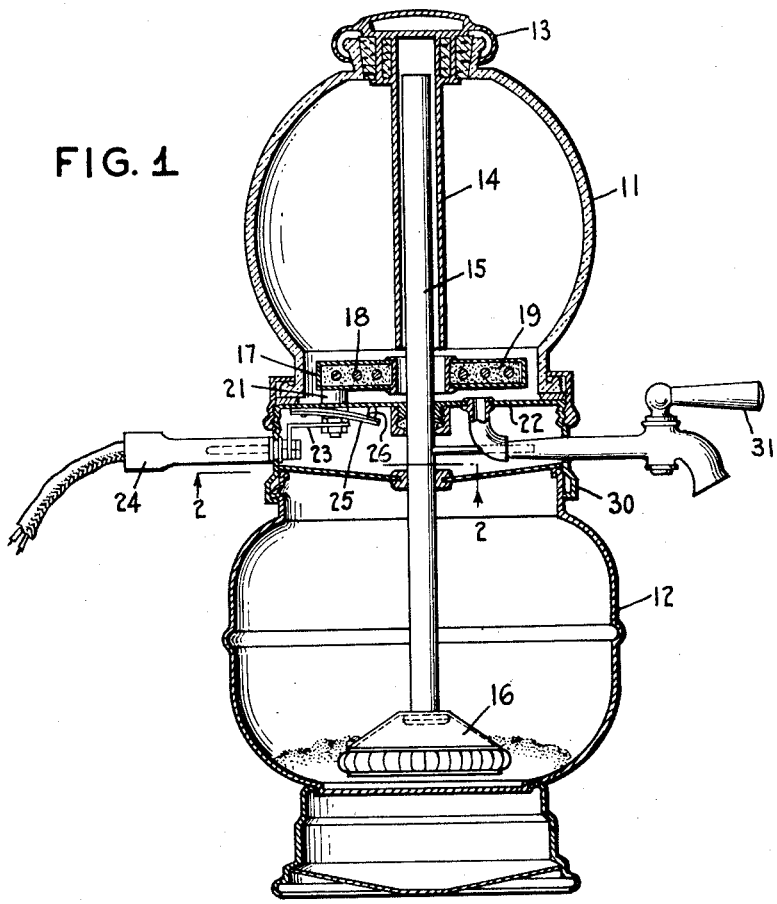
Figure 1 shows somewhat in outline and partially in section a coffee brewing apparatus to which my invention is shown as applied and in which the temperature of the body of water in contact with the coffee does not exceed a selected temperature, preferably 190°, which is at present understood to be the best temperature for this purpose.

Referring to Fig. 1, the coffee making apparatus comprises an upper vessel 11 and a lower vessel 12. The upper vessel is made air tight by a closure cap 13 which carries a tube 14 that constitutes one-half of a communicating connection between the upper and lower vessels. A tube 15, located inside of and concentric with tube 14, constitutes the second half of the communication passage between the two vessels. The tube 14 extends up from the lower vessel, and has on the lower end thereof a filter 16.

Mounted inside of the upper vessel 11 is a sheathed heating element 17 which comprises the electrical resistance wire 18 which is imbedded in an argillous insulating material 19 and enclosed in the sheath. The heating element is ring-shaped, being mounted concentrically with the tube 15, but spaced out of physical contact therewith. The open end of tube 14 does not extend to the level of the heating element. The heating element is mounted in place upon one or more spacing insulators 21 which serve to keep the heating element out of physical contact with the bottom 22 of the vessel 11, and allows an open space thereabout. The resistance element 18 is connected to a source of current supply through the connection indicated generally at 23, and the usual detachable connector plug 24 commonly used to connect an appliance with a wall socket.

Figure 2:
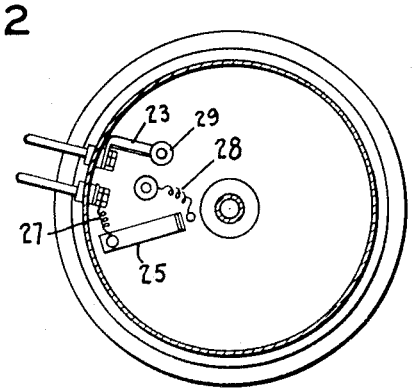
Fig. 2 is a cross section on line 2—2 of Fig. 1.

Secured directly upon the bottom 22, and outside the vessel 11, is a bi-metallic thermostatic element 25 with which cooperates a pair of contact members 26. Referring to Fig. 2, it will be seen that the bi-metallic element 25 is connected directly to one side of the supply line from the connector plug 24, as indicated at 27, the other contact 26 being connected to one side of the heating element, as indicated at 28. The other side of the heating element is connected to the opposite terminal pin, through the connection 29. Thus the movements of the thermostat control the energization of the heating element.

The faucet 31 is mounted to communicate with the vessel 11 through the bottom 22 as shown.

When it is desired to brew coffee in this apparatus, the vessel 11 is filled with water, through the cap 13, and the ground coffee is deposited in the vessel 12, which is detachable as at 30, from the vessel 11 by the usual bayonet and slot joint.

Electrical current is applied, and since the thermostat 25 normally maintains the contacts 26 closed, energization of the heating element 17 begins. As the water begins to heat up, pressure is created at the top of the body of water which forces water up the tube 14 and over the top of and down the tube 15 into the vessel 12. This process continues until substantially all of the water in the vessel 11 passes over into vessel 12. The water which first goes over into vessel 12 is heated slightly. The temperature of the water that subsequently passes into the vessel 12 is gradually at higher levels until the last water that passes over is substantially at boiling temperatures. However, the mass of water in the vessel 12 does not exceed a temperature of 190° which is sufficiently high for the brewing of coffee and has been scientifically demonstrated to be the temperature at which coffee will brew without extracting from the ground coffee bean numerous oils that are undesirable, and some that are in fact poisonous.

Between the heating element 17, and the bottom 22 is an insulating layer of water. As the temperature of the water remaining in the vessel 11 during the above described process has increased, it has finally heated the quantity of water between the heating element 17 and the bottom 22 above the temperature of, for example 200°. The thermostat is calibrated so that it will function at this temperature to separate the contacts 26 and thereby interrupt the supply of current to the heating element 17. However, there is a sufficient thermal lag factor in the heating element that the process of heating the remaining body of water and forcing it through the tubes 14 and 15 will continue uninterrupted. After a predetermined period, during which the coffee is brewed in the vessel 12, the closed vessel 11 will cool, condensation takes place therein producing a vacuum, and the brewed coffee will return to the vessel 11 under the pressure of the atmosphere existing in the vessel 12.

Thereafter, the heating element 17, with its definite residual heat factor by reason of the argillous material 19 used to imbed the resistance element 18, retains sufficient heat to maintain the body of brewed coffee in the vessel 11 at a temperature between 185° and 200° (assuming this to be the setting of the thermostat) which is hot, or at least too hot for human consumption. Due to the referred to residual heat factor, the heating element is slow to cool down below this lower temperature, and thus slow to cool the body of brewed coffee for a considerable period of time which can of course be to some extent predetermined. However, if the temperature of the body of brewed coffee drops below 185° (for example) the thermostat 25 again closes the contacts 26 and the heating element 17 is re-energized.

Since the coffee and the heating element are already heated, it is not necessary to overcome the thermal lag of the argillous material 19 as when starting the cooking operation and it will take but a short time to again raise the temperature of the brewed coffee to 200°. Meanwhile, the cap 13 has been loosened so as to relieve the air tight connection thereof to the vessel 11. As soon as the liquid coffee again reaches the temperature of 200°, the thermostat will operate to again open the contacts 26 and interrupt the current to the heating element 17.

This cycle will continue so long as the apparatus remains connected to the source of electrical energy.

Figure 4:
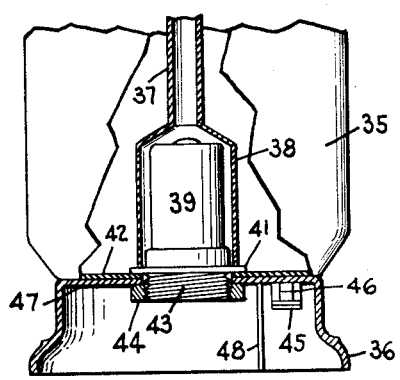
Fig. 4 is a view, partly in section and with parts broken away, of a portion of an ordinary coffee percolator to which my invention is shown as applied.

Fig. 4 illustrates the invention applied to a well known type of coffee percolator which comprises a vessel 35 supported upon a base 36. A container for the ground coffee (not shown) is suspended in the upper part of the vessel 35, the tube 37 extending beyond this container. The tube 37 terminates at its lower end in an enlarged well 38 in which is mounted an immersion type heating element 39, which may be constructed as described above in connection with the heating element 17.

The heating element 39 is supported upon an insulating ring 41 which rests upon the bottom 42 of the vessel 35. Heating element 39 is provided with a screw threaded extension 43 which extends through the bottom 42 and is engaged at its lower end by a screw threaded clamping ring 44.

A bi-metallic thermostatic element 45, carrying one of a pair of contacts 46, is mounted upon the top wall 47 of the base 36, which wall is in direct contact with the bottom 42 of the vessel 35. Care is taken that there should be no heat radiation from the heating element 39 affecting the bi-metallic element 45 and for this purpose the extension 43 of the heating element may be of such material, or covered with such material, as to prevent such radiation, or a shield 48 may be mounted about the thermostat for that purpose.

One of the contacts 46 is connected to the heating element 39, the other contact is connected to one of a pair of terminals (not shown) similar to those shown in Fig. 2. The other terminal is connected directly to the heating element and thus the operation of the thermostat controls the energization of heating element 39.

As the heating element 39 is energized, the water in the well 38 boils and is forced through the tube 37 over the ground coffee, from whence it drips back into the vessel 35. This process continues until the whole body of liquid in the vessel 35 attains a temperature of say 190° whereupon the thermostat 45 will operate to open the contacts 46 and cut off the supply of energy to the heating element 39. At this point the coffee brewing operation is pratically completed and liquid coffee is contained in the vessel 35. The remainder of the cycle of operation is as described above in connection with the apparatus of Fig. 1, and need not be repeated here.

Figure 5:
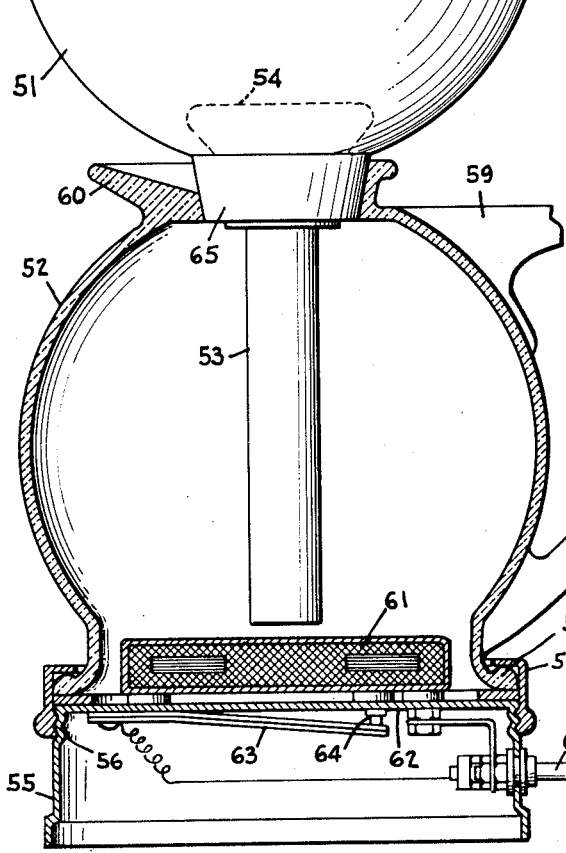
Fig. 5 is a view partly in section of another form of coffee brewing apparatus to which my invention is also shown applied.

Fig. 5 shows a still further modified form of coffee brewing apparatus wherein there is an upper vessel 51 and a lower vessel 52. The upper vessel has connected thereto a tube 53 which forms the communicating passage between the two vessels. Mounted at the upper end of the tube 53 and within the vessel 51 is a filter 54.

The lower vessel 52 is mounted upon a base 55 which is screw threaded at its upper end as indicated at 56. The vessel 52 is provided at its bottom with an annular lip 57 which is engaged by a clamping ring 58 that is screwed upon the portion 56 of the base 55, a gasket being located between the lip and the base. The vessel 52 is also provided with a handle 59 secured thereto, and a pouring spout 60.

The heating element 61 is mounted inside the vessel 52 as described above in connection with the mounting of the heating element 17 in the apparatus of Fig. 1. The element 61 may also be constructed as described above in connection with the heating element 17 of Fig. 1, except that in this instance the heating element need not be ring-shaped.

Mounted upon the base 62 of the vessel 52 is a bi-metallic thermostatic element 63 which controls the opening and closing of a pair of contact members 64. The electrical connections to the thermostat and between the thermostat and the heating element are as described above in connection with Figs. 1 and 2 and therefore need not be repeated here.

When it is desired to brew coffee in this apparatus, the ground coffee is deposited in the vessel 51, through the top thereof, and water is placed in the vessel 52. The two vessels are mounted upon each other with the air tight connection as shown at 65, and the electrical energy applied to the terminals 66. As the temperature of the heating element increases, the water is forced up the tube 53 into the vessel 51 where it commingles with the ground coffee. As soon as the temperature of the water remaining in the vessel 52 reaches a predetermined point, the thermostat 63 will operate to break the contacts 64 and thus de-energize the heating element 61. After a predetermined period, the vessel 52 will cool down, the vapor therein will condense and create a vacuum which will permit the return of the liquid coffee from the vessel 51 into the vessel 52.

Thereafter, the cycle of operation in keeping the liquid coffee in the heated vessel 52 will be exactly as described above in connection with Fig. 1.

Figure 3:
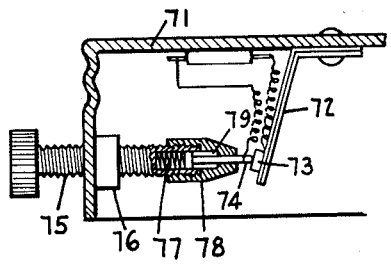
Fig. 3 is a partial sectional view showing a modified thermostat arrangement.

The thermostatic control may well be arranged to be adjustable for operation at various temperatures. An arrangement of this character is shown in Fig. 3 purely by way of example of a manner of mounting and adjustment. No other electrical connections or apparatus are shown in this figure for the sake of clarity.

The bottom of a vessel is indicated generally at 71. A bi-metallic thermostat 72 is mounted in direct contact with the bottom of the vessel 71, the thermostat controlling a pair of contact members 73, 74. Contact member 73 is mounted upon the thermostat 72 and the other contact member 74 is mounted in the end of a screw-threaded rod 75 that is adjustable in a stationary block 76. The contact 74 is engaged by a spring 77 and pressed forward in the holder portion 78. It will readily be seen that varying the position of the holder will vary the distance the contact 74 will move before the stop 79 is reached and the remainder of the movement effective to separate the contacts 73, 74. In this manner, it will take a greater or less temperature for the thermostat bar to move to break the connection between the contacts 73, 74.

In all instances (but omitted from the other figures of the drawings for the sake of clarity) a small fixed condenser 81 will be connected across the contact members 73, 74, for the purpose of suppressing the arc as the contacts are opened, and also preventing the vibrations due to the making and breaking of the contacts creating noises in the radio sets.

While my invention has been shown and described in connection with coffee brewing apparatus, it is apparent that the same principles will apply to any apparatus in which it is desired to accomplish the objects accomplished by my invention.

Modifications may be made in the arrangement and location of parts within the spirit and scope of my invention, and such modifications are intended to be covered by the appended claims.

I claim:

1. In coffee making apparatus, the combination comprising a vessel for containing the brewed coffee, a heating element having a thermal lag factor and mounted in said vessel so as to be out of substantial contact therewith but in complete contact with the contents of said vessel, and a thermostat for controlling the operation of the heating element and mounted so as to maintain a desired temperature for the brewed coffee.

2. In coffee making apparatus, the combination comprising a vessel for containing the brewed coffee, a heating element having a thermal lag factor and mounted in said vessel so as to be out of substantial contact therewith but in complete contact with the contents of said vessel, and a thermostat for controlling the operation of the heating element so as to maintain a desired temperature for the brewed coffee and mounted so as to be subject to the temperature of the body of brewed coffee.

3. In coffee making apparatus, the combination comprising a vessel for containing the brewed coffee, a heating element having a thermal lag factor and mounted within said vessel so as to be completely immersed in the contents thereof and so as to be out of substantial contact with said vessel and a thermostat for controlling the operation of the heating element and mounted outside of and upon said vessel.

4. In apparatus for maintaining the temperature of a body of liquid within a certain range, a heating element in immersion communication with said body of liquid and having a substantial residual heat factor, and a thermostat responsive to heat of the body of liquid and controlling the operation of the heating element to control the temperature of the body of liquid both before and after initial heating thereof.

5. In coffee making apparatus, the combination comprising a vessel for containing the brewed coffee, a heating element in immersion communication with the body of liquid in said vessel but substantially insulated from the walls thereof by the body of liquid, and a thermostat for controlling the operation of the heating element and mounted upon the wall of said vessel.

6. In coffee making apparatus, a pair of vessels one of which contains the coffee bean and the second of which is closed to the atmosphere and contains the water, a communication between said vessels, a heating element having a substantial residual heat factor, and mounted in the second vessel, the heat of said element generating pressure to force the water into the first vessel, and a thermostat controlling the operation of the heating element and controlled by the temperature of the liquid in the second vessel, the brewed coffee returning to the second vessel as condensation takes place therein, the thermostat operating thereafter to maintain the temperature of the brewed coffee.

7. In coffee brewing apparatus, a closed vessel for containing first the water and subsequently the brewed coffee, a heating element mounted in said vessel having a thermal lag factor, a thermostat for controlling the operation of the heating element and adjusted to de-energize the heating element just prior to the completion of the brewing operation, and thereafter to control the energization of the heating element to maintain the brewed coffee at predetermined temperatures.

JOHN E. SMITH.